United States Patent
Fang et al.

(10) Patent No.: US 8,773,391 B2
(45) Date of Patent: Jul. 8, 2014

(54) RESISTIVE MULTI-TOUCH DEVICE AND METHOD FOR DETECTING TOUCHED POINTS OF THE RESISTIVE MULTI-TOUCH DEVICE THEREOF

(75) Inventors: Ying-Lin Fang, Tainan (TW); Chang-Lung Wu, Tainan (TW); Ming-Hung Weng, Tainan (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 633 days.

(21) Appl. No.: 13/042,479

(22) Filed: Mar. 8, 2011

(65) Prior Publication Data

US 2012/0229413 A1 Sep. 13, 2012

(51) Int. Cl.
*G06F 3/045* (2006.01)
(52) U.S. Cl.
USPC .................. 345/174; 345/173; 178/18.06
(58) Field of Classification Search
CPC .............. G06F 3/045; G06F 2203/04104
See application file for complete search history.

(56) References Cited

U.S. PATENT DOCUMENTS

| | | | | |
|---|---|---|---|---|
| 4,622,437 A * | 11/1986 | Bloom et al. | | 178/18.05 |
| 5,181,030 A * | 1/1993 | Itaya et al. | | 341/20 |
| 5,798,756 A * | 8/1998 | Yoshida et al. | | 345/179 |
| 2009/0201268 A1* | 8/2009 | Endo et al. | | 345/174 |
| 2010/0007619 A1* | 1/2010 | Jiang et al. | | 345/173 |
| 2010/0182278 A1* | 7/2010 | Li et al. | | 345/174 |
| 2010/0321336 A1* | 12/2010 | Chou et al. | | 345/174 |
| 2011/0031042 A1* | 2/2011 | Wu et al. | | 178/18.06 |
| 2011/0148790 A1* | 6/2011 | Shih et al. | | 345/173 |
| 2012/0013563 A1* | 1/2012 | Chou et al. | | 345/174 |

FOREIGN PATENT DOCUMENTS

| | | |
|---|---|---|
| TW | 201009674 | 3/2010 |
| TW | 201028899 | 8/2010 |

\* cited by examiner

*Primary Examiner* — Jesus Hernandez
(74) *Attorney, Agent, or Firm* — Winston Hsu; Scott Margo

(57) ABSTRACT

A resistive multi-touch device includes a touch panel, a matrix, a scanning circuit, a first multiplexer, a second multiplexer, and a touch controller. The matrix includes m pairs of first electrodes forming m columns and n pairs of second electrodes forming n rows. The scanning circuit detects which column of first electrodes is touched to generate a first selecting signal and which row of second electrodes is touched to generate a second selecting signal according to a predetermined scanning mode. The first multiplexer selects a first signal of the touched first electrode from signals transmitted on the first electrodes according to first selecting signal. The second multiplexer selects a second signal of the touched second electrode from signals transmitted on the second electrodes according to second selecting signal. The touch controller calculates coordinate value of touched point according to first signal and second signal.

10 Claims, 14 Drawing Sheets

RESISTIVE MULTI-TOUCH DEVICE AND METHOD FOR DETECTING TOUCHED POINTS OF THE RESISTIVE MULTI-TOUCH DEVICE THEREOF

BACKGROUND OF THE INVENTION

1. Field of the Invention

The present invention relates to an resistive multi-touch device, and more particularly, to an resistive multi-touch device and a related method for detecting touched points of the resistive multi-touch device according to a predetermined scanning mode.

2. Description of the Prior Art

In today's consumer electronics markets, portable electronic products such as personal digital assistants (PDAs), mobile phones, and PDA phones have already adopted a touch panel as their interface tool for data communication. Currently, the electronic products are usually designed with the trend of light weight and small size, hence there is no enough space to accommodate traditional input devices such as keyboards or mice. Especially with the demands for human nature design in Tablet PCs, display devices equipped with a touch panel are becoming an important component of a variety of electronic products.

A resistive multi-touch panel is one of the popular touch panels. However, with the increasing size of the touch panel and the increasing number of the touch points, the time for detecting locations of the touch points is increased due to parasitic resistance and capacitance effects. Hence, how to improve the time for detecting locations of the touch points has become an important topic of this field.

SUMMARY OF THE INVENTION

It is one of the objectives of the present invention to provide a resistive multi-touch device and a method for method for detecting touched points of the resistive multi-touch device to solve the abovementioned problems.

According to one embodiment, a resistive multi-touch device is provided. A resistive multi-touch device includes a multi-wire resistive touch panel, a matrix, a scanning circuit, a first multiplexer, a second multiplexer, and a touch controller. The matrix includes m pairs of first electrodes arranged along a first direction to form m columns and n pairs of second electrodes arranged along a second direction to form n rows, wherein each pair of first electrodes includes a first positive electrode and a first negative electrode, and each pair of second electrodes includes a second positive electrode and a second negative electrode. The scanning circuit 130 detects which column of the m pairs of first electrodes is touched to generate a first selecting signal and detects which row of the n pairs of second electrodes is touched to generate a second selecting signal according to a predetermined scanning mode. The first multiplexer is coupled to the m first positive electrodes (or the m first negative electrodes) and the scanning circuit, for selecting a first signal of the touched first positive electrode or the touched first negative electrode from signals transmitted on the m pairs of first electrodes according to the first selecting signal. The second multiplexer is coupled to the n second positive electrodes (or the n second negative electrodes) and the scanning circuit, for selecting a second signal of the touched second positive electrode or the touched second negative electrode from signals transmitted on the n pairs of second electrodes according to the second selecting signal. The touch controller is coupled to the first multiplexer and the second multiplexer, for receiving the first signal and the second signal and for calculating a coordinate value of a touched point according to the first signal and the second signal.

According to an aspect of the present invention, the predetermined scanning mode is a sequence scanning mode; and the scanning circuit sequentially detects which column of the m pairs of first electrodes is touched and detects which row of the n pairs of second electrodes is touched one-by-one from a left-up corner to a right-down corner of the matrix.

According to another aspect of the present invention, the predetermined scanning mode is a row scanning mode; and the scanning circuit detects which column of the m pairs of first electrodes is touched and detects which row of the n pairs of second electrodes is touched row-by-row.

According to another aspect of the present invention, the predetermined scanning mode is a column scanning mode; and the scanning circuit detects which column of the m pairs of first electrodes is touched and detects which row of the n pairs of second electrodes is touched column-by-column.

According to another aspect of the present invention, the predetermined scanning mode is a matrix scanning mode; and the scanning circuit detects which column of the m pairs of first electrodes is touched and detects which row of the n pairs of second electrodes is touched according to a second matrix, and the second matrix is generated according to the matrix.

According to one embodiment, a method for detecting touched points of a resistive multi-touch device having a multi-wire resistive touch panel is provided. The method includes the following steps: providing a matrix coupled to the multi-wire resistive touch panel, wherein the matrix comprises m pairs of first electrodes arranged along a first direction to form m columns of the matrix and n pairs of second electrodes arranged along a second direction to form n rows of the matrix, each pair of first electrodes comprises a first positive electrode and a first negative electrode, and each pair of second electrodes comprises a second positive electrode and a second negative electrode; detecting which column of the m pairs of first electrodes is touched to generate a first selecting signal and detecting which row of the n pairs of second electrodes is touched to generate a second selecting signal according to a predetermined scanning mode; selecting a first signal of the touched first positive electrode or the touched first negative electrode from signals transmitted on the m pairs of first electrodes according to the first selecting signal; selecting a second signal of the touched second positive electrode or the touched second negative electrode from signals transmitted on the n pairs of second electrodes according to the second selecting signal; and receiving the first signal and the second signal, and for calculating a coordinate value of a touched point according to the first signal and the second signal.

It is one of the objectives of the present invention to improve the scanning time for detecting multi touches on the resistive multi-touch device by adopting the predetermined scanning mode (such as, the sequence scanning mode, the row scanning mode, the column scanning mode, or the matrix scanning mode) disclosed in the present invention.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . . ". The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
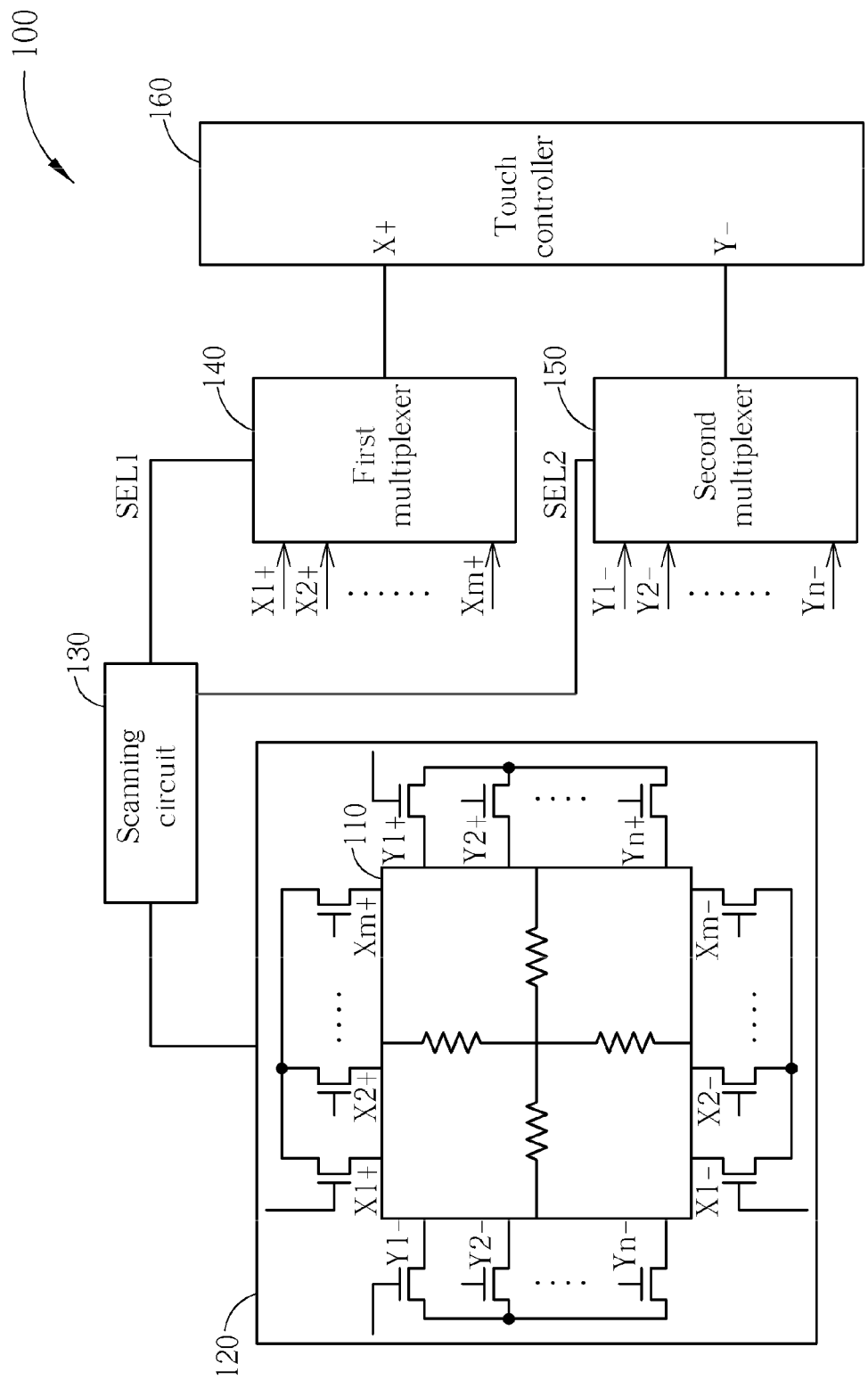
FIG. 1 is a block diagram of a resistive multi-touch device according to an embodiment of the present invention.
Figure 2A:
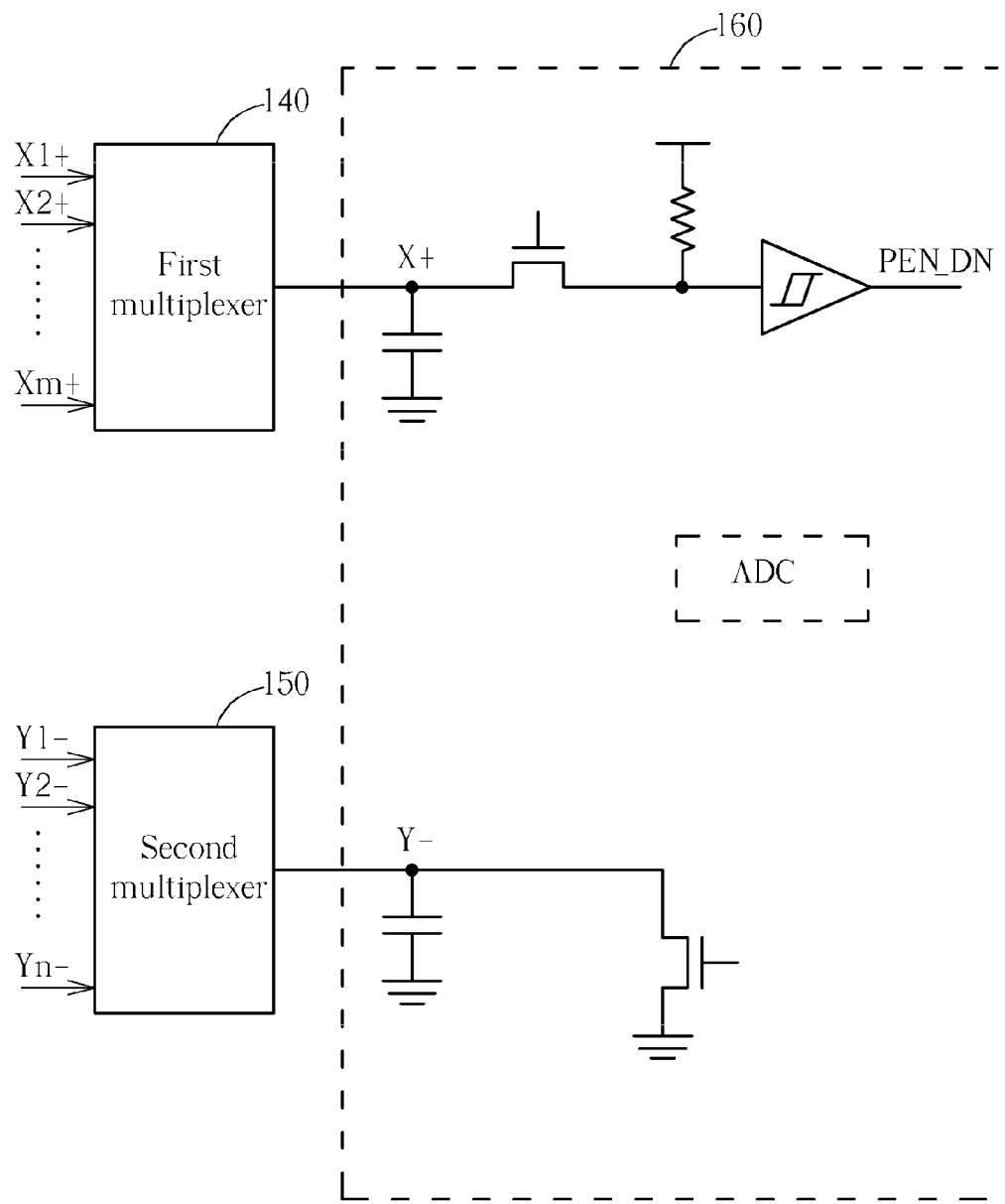
FIG. 2A is an equivalent circuit diagram of the resistive multi-touch device shown in FIG. 1 according to an embodiment of the present invention.
Figure 2B:
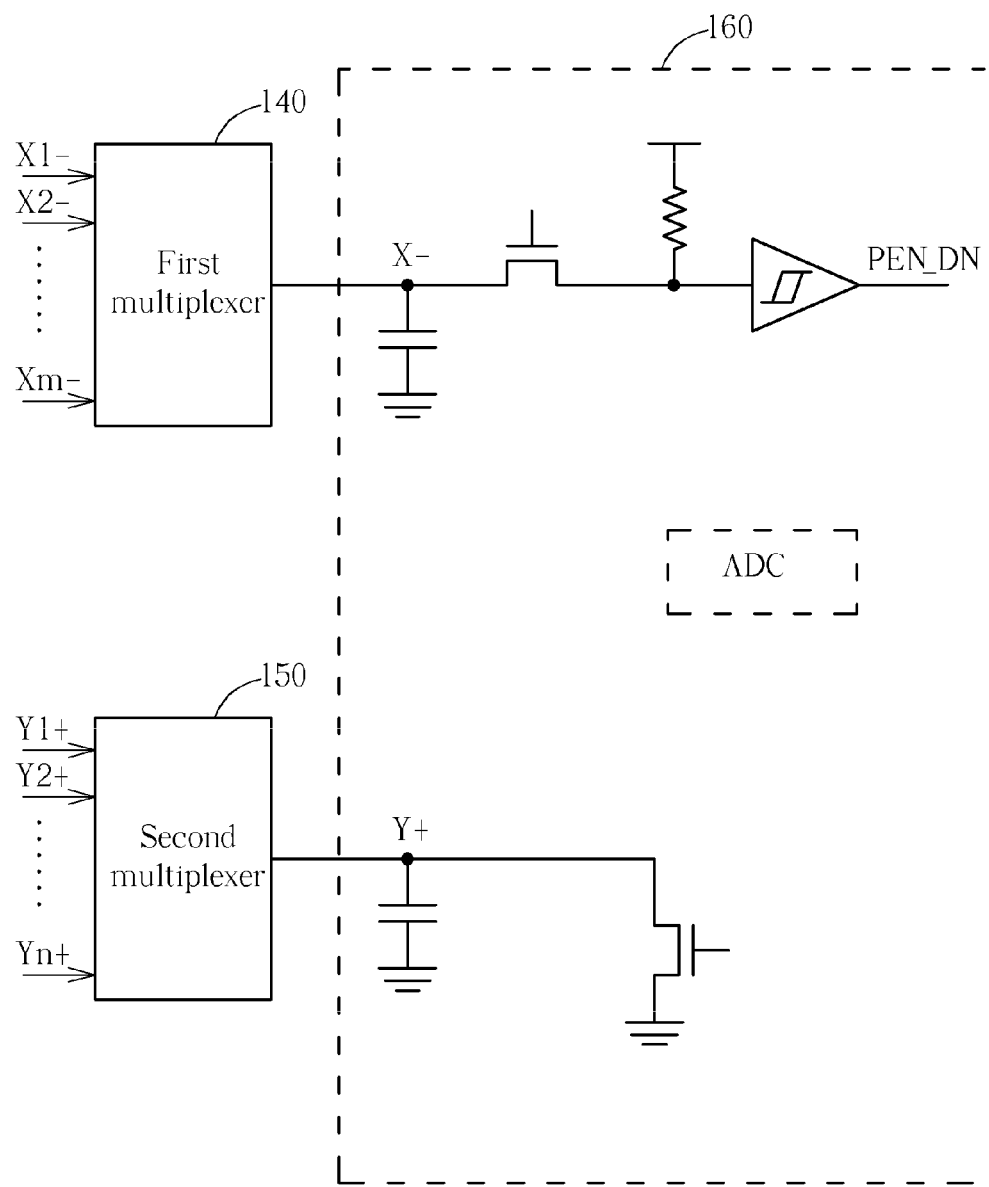
FIG. 2B is an equivalent circuit diagram of the resistive multi-touch device shown in FIG. 1 according to another embodiment of the present invention.

Please refer to FIG. 1 together with FIG. 2A and FIG. 2B. FIG. 1 is a block diagram of a resistive multi-touch device 100 according to an embodiment of the present invention, FIG. 2A is an equivalent circuit diagram of the resistive multi-touch device shown in FIG. 1 according to an embodiment of the present invention, and FIG. 2B is an equivalent circuit diagram of the resistive multi-touch device shown in FIG. 1 according to another embodiment of the present invention. As shown in FIG. 1, the resistive multi-touch device 100 includes, but is not limited to, a multi-wire resistive touch panel 110, a matrix 120, a scanning circuit 130, a first multiplexer 140, a second multiplexer 150, and a touch controller 160. The matrix 120 includes m pairs of first electrodes $X1~Xm$ arranged along a first direction (i.e., the X direction) to form m columns and n pairs of second electrodes $Y1~Yn$ arranged along a second direction (i.e., the Y direction) to form n rows, wherein each pair of first electrodes includes a first positive electrode and a first negative electrode (i.e., $X1+~Xm+$ and $X1-~Xm-$), and each pair of second electrodes includes a second positive electrode and a second negative electrode (i.e., $Y1+~Yn+$ and $Y1-~Yn-$). The scanning circuit 130 detects which column of the m pairs of first electrodes $X1~Xm$ is touched to generate a first selecting signal SEL1 and detects which row of the n pairs of second electrodes $Y1~Yn$ is touched to generate a second selecting signal SEL2 according to a predetermined scanning mode.

Moreover, the first multiplexer 140 is coupled to the m first positive electrodes $X1+~Xm+$ (or the m first negative electrodes $X1-~Xm-$) and the scanning circuit 130, for selecting a first signal of the touched first positive electrode or the touched first negative electrode from signals transmitted on the m pairs of first electrodes $X1~Xm$ according to the first selecting signal SEL1. The second multiplexer 150 is coupled to the n second negative electrodes $Y1-~Yn-$ (or the n second positive electrodes $Y1+~Yn+$) and the scanning circuit 130, for selecting a second signal of the touched second positive electrode or the touched second negative electrode from signals transmitted on the n pairs of second electrodes $Y1~Yn$ according to the second selecting signal SEL2. The touch controller 160 is coupled to the first multiplexer 140 and the second multiplexer 150, for receiving the first signal and the second signal and for calculating a coordinate value of a touched point according to the first signal and the second signal.

As an illustration, in FIG. 2A, the first multiplexer 140 is coupled to the m first positive electrodes $X1+~Xm+$, for selecting the first signal $X+$ of the touched first positive electrode from signals transmitted on the m first positive electrodes $X1+~Xm+$ according to the first selecting signal SEL1. The second multiplexer 150 is coupled to the n second negative electrodes $Y1-~Yn-$, for selecting the second signal $Y-$ of the touched second negative electrode from signals transmitted on the n second negative electrodes $Y1-~Yn-$ according to the second selecting signal SEL2. If any of the first positive electrodes $X1+~Xm+$ is touched, a signal PEN_DN will be pull high. At this time, an embedded ADC 162 of the touch controller 160 starts to calculate the coordinate value of the touched point according to the first signal $X+$ and the second signal $Y-$.

As another illustration, in FIG. 2B, the first multiplexer 140 is coupled to the m first negative electrodes $X1-~Xm-$, for selecting the first signal $X-$ of the touched first negative electrode from signals transmitted on the m first negative electrodes $X1-~Xm-$ according to the first selecting signal SEL1. The second multiplexer 150 is coupled to the n second positive electrodes $Y1+~Yn+$, for selecting the second signal $Y+$ of the touched second positive electrode from signals transmitted on the n second positive electrodes $Y1+~Yn+$ according to the second selecting signal SEL2. If any of the first negative electrodes $X1-~Xm-$ is touched, a signal PEN_DN will be pull high. At this time, an embedded ADC 162 of the touch controller 160 starts to calculate the coordinate value of the touched point according to the first signal $X-$ and the second signal $Y+$.

In the following descriptions, several embodiments are taken for illustrating how the scanning circuit 130 detects which column of the m pairs of first electrodes $X1~Xm$ is touched and detects which row of the n pairs of second electrodes $Y1~Yn$ is touched according to the predetermined scanning mode. Please note that, in these embodiments, the first multiplexer 140 being coupled to the m first positive electrodes X1+~Xm+ and the second multiplexer 150 being coupled to the n second negative electrodes Y1-~Yn- is cited as an example (i.e., the equivalent circuit diagram shown in FIG. 2A), but this should not be considered as a limitation of the present invention. In other embodiments, the first multiplexer 140 being coupled to the m first negative electrodes X1-~Xm- and the second multiplexer 150 being coupled to the n second positive electrodes Y1+~Yn+ can be cited as an example (i.e., the equivalent circuit diagram shown in FIG. 2B).

Figure 3:
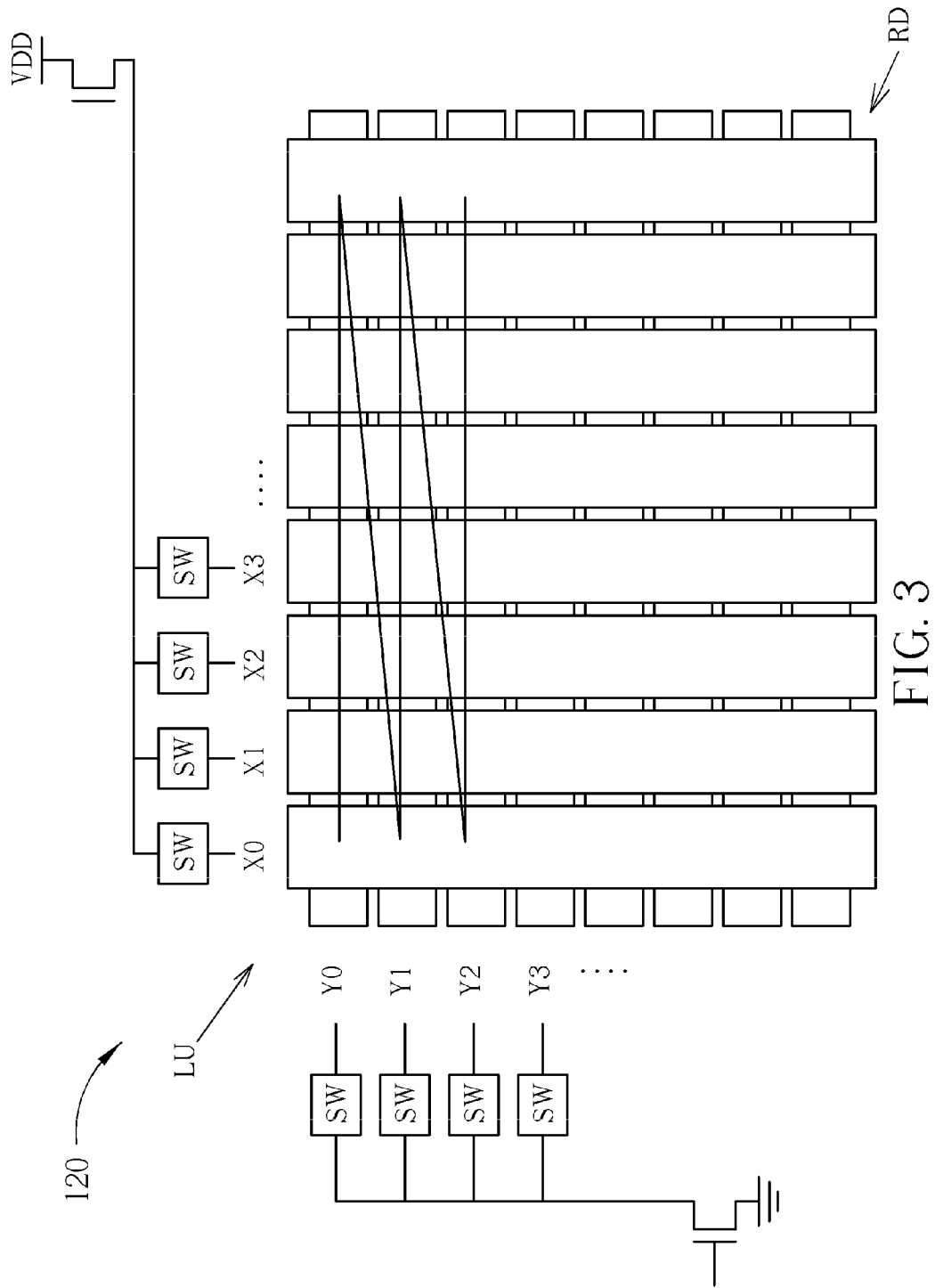
FIG. 3 is a diagram illustrating a predetermined scanning mode adopted by the scanning circuit shown in FIG. 1 according to a first embodiment of the present invention.

Please refer to FIG. 3. FIG. 3 is a diagram illustrating a predetermined scanning mode adopted by the scanning circuit shown in FIG. 1 according to a first embodiment of the present invention. In this embodiment, the predetermined scanning mode is a sequence scanning mode. As shown in FIG. 3, the matrix 120 includes m pairs of first electrodes X1~Xm arranged along the X direction to form m columns of the matrix 120 and n pairs of second electrodes Y1~Yn arranged along the Y direction to form n rows of the matrix 120. Please note that in this embodiment, the scanning circuit 130 sequentially detects which column of the m pairs of first electrodes X1~Xm is touched and detects which row of the n pairs of second electrodes Y1~Yn is touched one-by-one from a left-up corner LU to a right-down corner RD of the matrix 120.

Figure 4A:
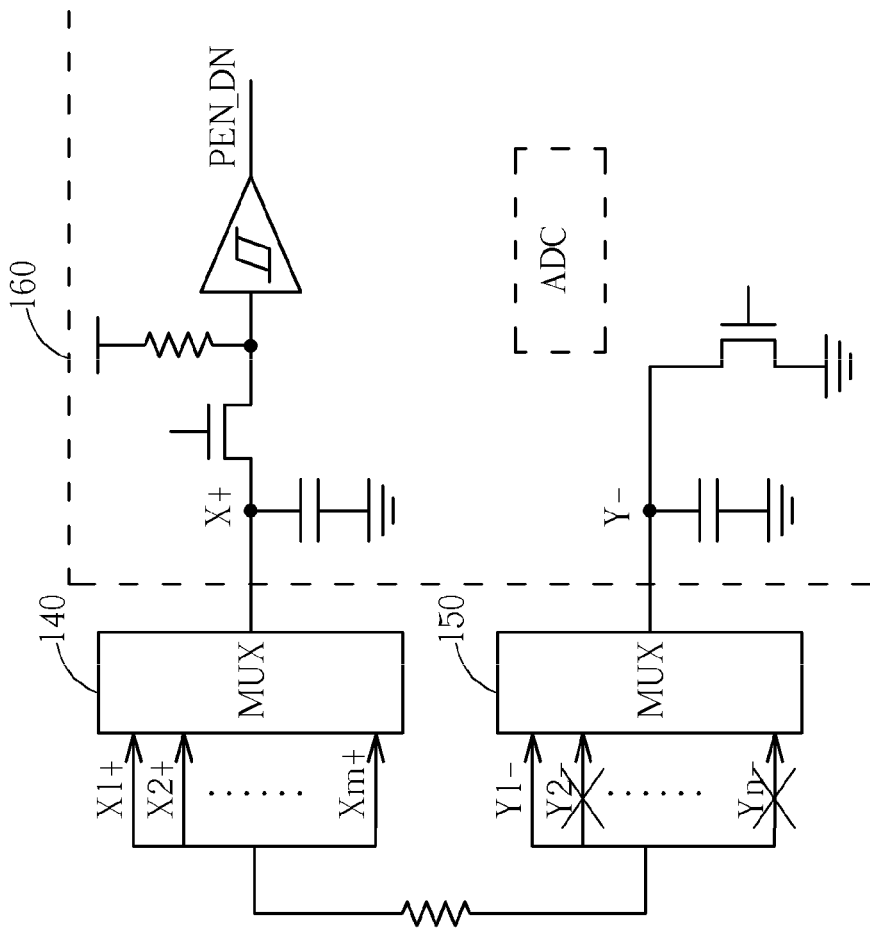
FIG. 4 (including sub-diagrams 4A and 4B) is a diagram illustrating a predetermined scanning mode adopted by the scanning circuit shown in FIG. 1 according to a second embodiment of the present invention.
Figure 4B:
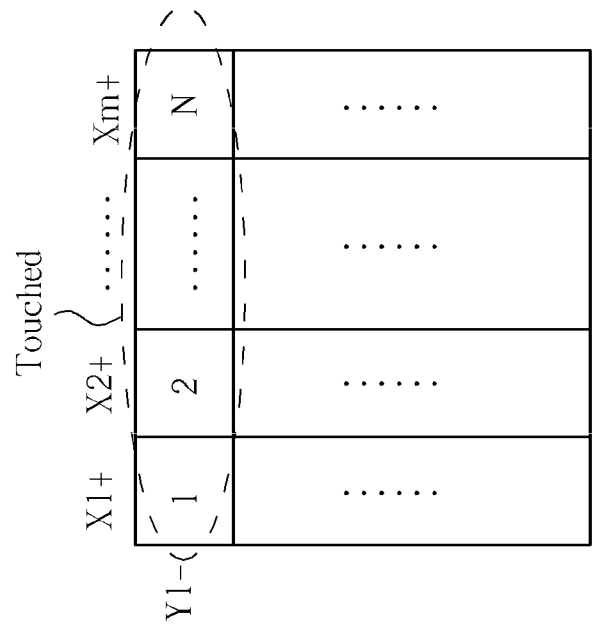

Please refer to FIG. 4. FIG. 4 (including sub-diagrams 4A and 4B) is a diagram illustrating a predetermined scanning mode adopted by the scanning circuit shown in FIG. 1 according to a second embodiment of the present invention. In this embodiment, the predetermined scanning mode is a row scanning mode. As shown in 4A, a designated second electrode (i.e., Y1-) is switched on while the other (n-1) second electrodes Y2-~Yn- are switched off, and all of the m first electrodes X1+~X1m+ are switched on in order to check whether the row corresponding to the designated second electrode Y1- is touched. As shown in 4B, if the row corresponding to the designated second electrode Y1- is touched, the designated second electrode Y1- is switched on, and the m first electrodes X1+~X1m+ are sequentially switched on one-by-one in order to check which column of the m first electrodes X1+~X1m+ is touched. For example, during a period T1, the second electrode Y1- is switched on and the first electrode X1+ is switched on to check whether the channel [X1+, Y1-] is touched; during a period T2, the second electrode Y1- is switched on and the first electrode X2+ is switched on to check whether the channel [X2+, Y1-] is touched; and so on. What calls for special attention is that: in this embodiment, the scanning circuit 130 detects which column of the m pairs of first electrodes is touched and detects which row of the n pairs of second electrodes is touched row-by-row.

Figure 5A:
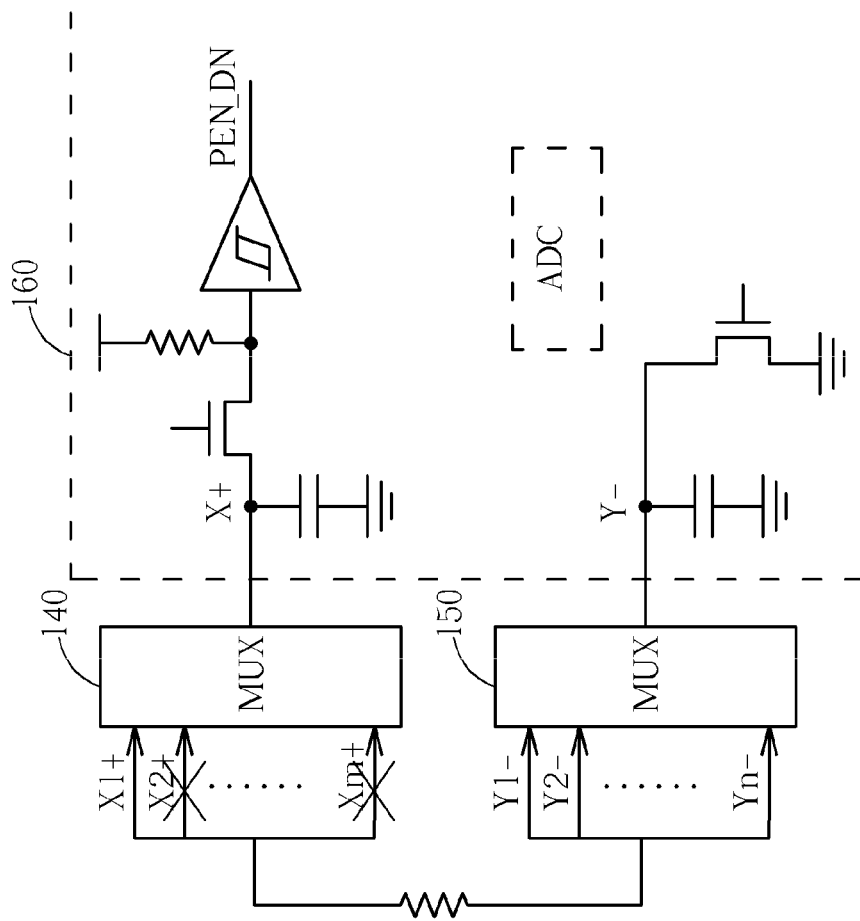
FIG. 5 (including sub-diagrams 5A and 5B) is a diagram illustrating a predetermined scanning mode adopted by the scanning circuit shown in FIG. 1 according to a third embodiment of the present invention.
Figure 5B:
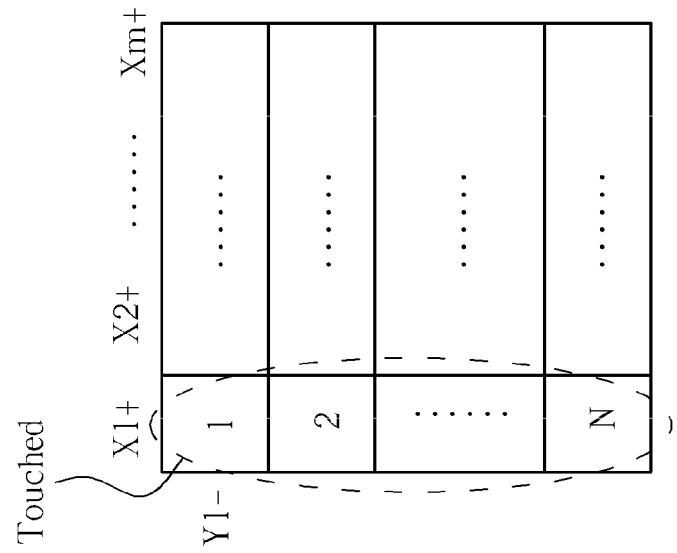

Please refer to FIG. 5. FIG. 5 (including sub-diagrams 5A and 5B) is a diagram illustrating a predetermined scanning mode adopted by the scanning circuit shown in FIG. 1 according to a third embodiment of the present invention. In this embodiment, the predetermined scanning mode is a column scanning mode. As shown in 5A, a designated first electrode (i.e., the X1+) is switched on while the other (m-1) first electrodes X2+~Xm+ are switched off, and all of the n second electrodes Y1-~Yn- are switched on in order to check whether the column corresponding to the designated first electrode X1+ is touched. As shown in 5B, if the column corresponding to the designated first electrode X1+ is touched, the designated first electrode X1+ is switched on, and the n second electrodes Y1-~Yn- are sequentially switched on one-by-one in order to check which row of the n second electrodes Y1-~Yn- is touched. For example, during a period T1, the first electrode X1+ is switched on and the second electrode Y1- is switched on to check whether the channel [X1+, Y1-] is touched; during a period T2, the first electrode X1+ is switched on and the second electrode Y2- is switched on to check whether the channel [X1+, Y2-] is touched; and so on. What calls for special attention is that: in this embodiment, the scanning circuit 130 detects which column of the m pairs of first electrodes is touched and detects which row of the n pairs of second electrodes is touched column-by-column.

Figure 6A:
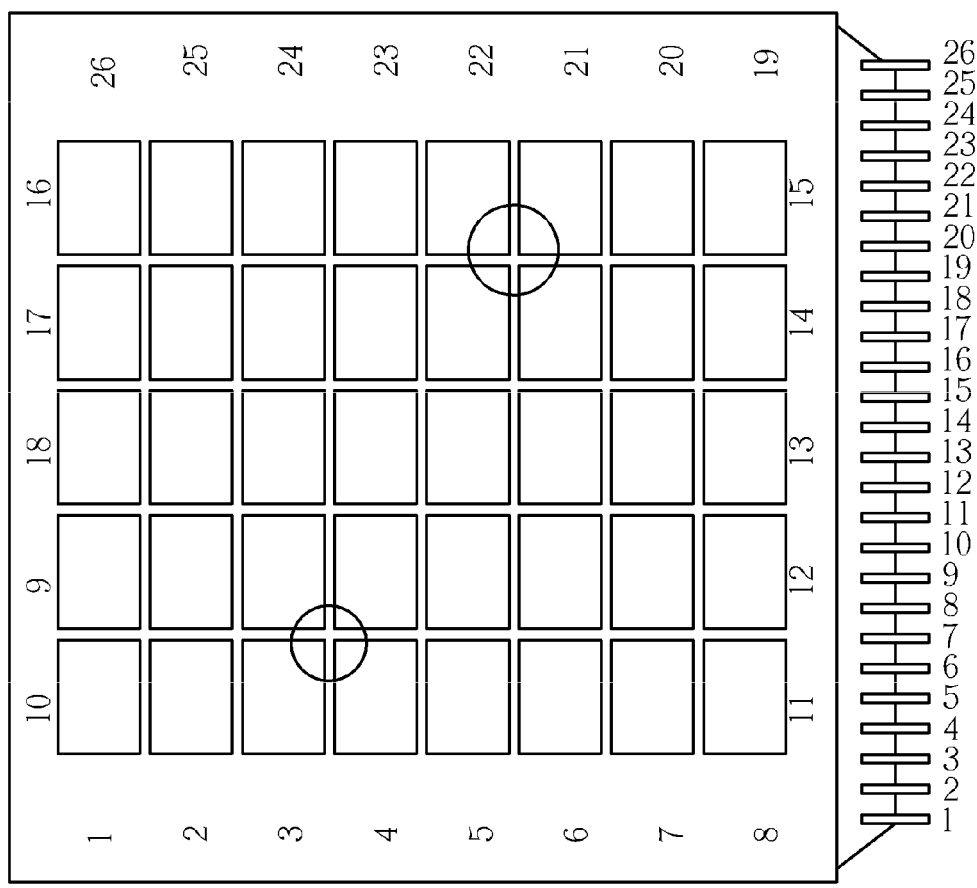
FIG. 6 (including sub-diagrams 6A, 6B, and 6C) is a diagram illustrating a predetermined scanning mode adopted by the scanning circuit shown in FIG. 1 according to a fourth embodiment of the present invention.
Figure 6B:
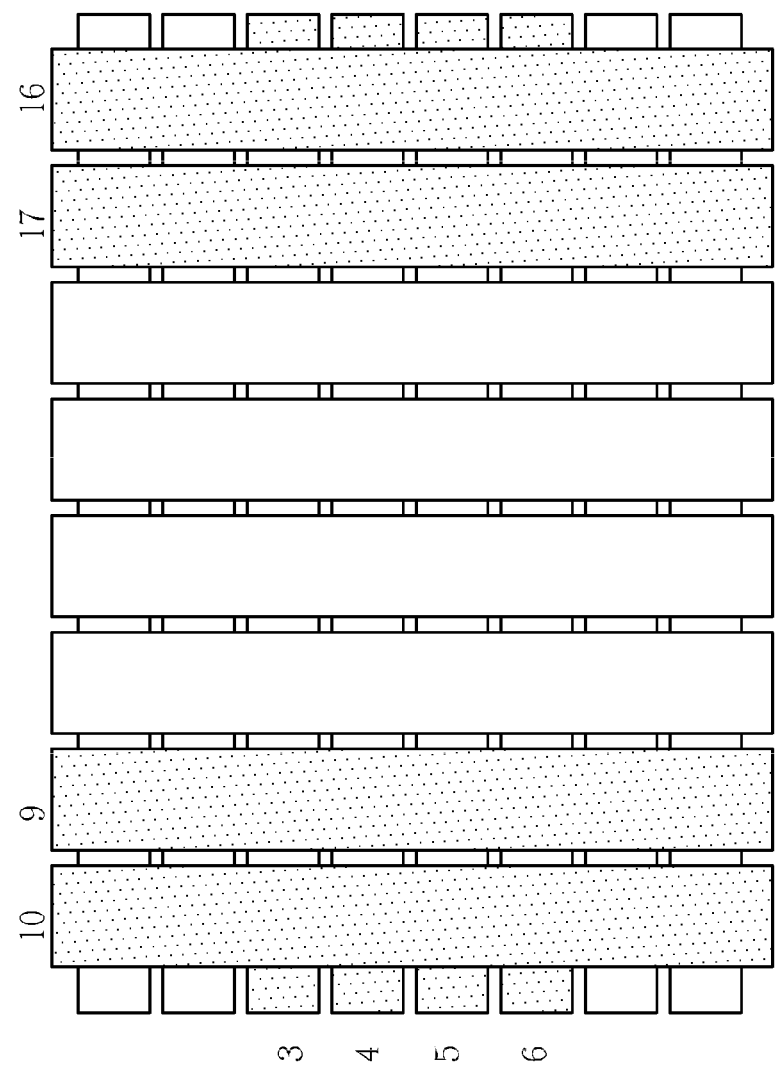
Figure 6C:
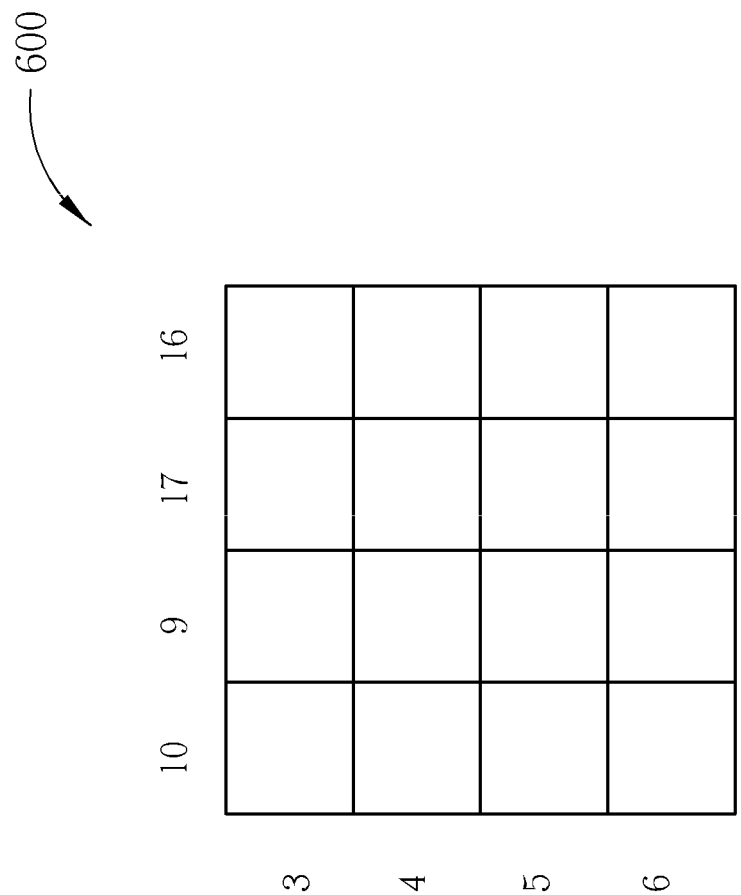

Please refer to FIG. 6. FIG. 6 (including sub-diagrams 6A, 6B, and 6C) is a diagram illustrating a predetermined scanning mode adopted by the scanning circuit shown in FIG. 1 according to a fourth embodiment of the present invention. In this embodiment, the predetermined scanning mode is a matrix scanning mode. As shown in 6A, all of the n second electrodes Y1-~Yn- are switched on and the m first electrodes X1+~Xm+ are sequentially switched on one-by-one in order to find the touched columns of the m pairs of first electrodes X1~Xm; all of the m first electrodes X1+~Xm+ are switched on and the n second electrodes Y1-~Yn- are sequentially switched on one-by-one in order to find the touched rows of the n pairs of second electrodes Y1~Yn. For example, the columns [10 9 17 16] are touched, and the rows [3 4 5 6] are touched. As shown in 6B, a second matrix 600 is generated according to the touched columns of the m pairs of first electrodes (e.g., the columns [10 9 17 16] are touched) and the touched rows of the n pairs of second electrodes (e.g., the rows [3 4 5 6] are touched). As shown in 6C, the scanning circuit sequentially detects which point of the second matrix 600 is touched one-by-one from a left-up corner LU to a right-down corner RD of the second matrix 60. Please note that in this embodiment, the scanning circuit 130 detects which column of the m pairs of first electrodes X1~Xm is touched and detects which row of the n pairs of second electrodes Y1~Yn is touched according to the second matrix 600, and the second matrix 600 is generated according to the matrix 120.

What calls for special attention is that, in this embodiment, the sequence scanning mode (e.g., the method for sequentially detecting which point of the second matrix is touched one-by-one from a left-up corner to a right-down corner of the second matrix) is applied to the second matrix after the matrix scanning mode has been applied to the original matrix to generate the second matrix. However, this embodiment is for illustrative purposes only, and is not meant to be limitations of the present disclosure. In other embodiments, the row scanning mode (e.g., the method for detecting which point of the second matrix is touched row-by-row) or the column scanning mode (e.g., the method for detecting which point of the second matrix is touched column-by-column) can be applied to the second matrix after the matrix scanning mode has been applied to the original matrix to generate the second matrix. Those skilled in the art should appreciate that various modifications or various combination of the predetermined scanning mode (including the sequence scanning mode, the row scanning mode, the column scanning mode, the matrix scanning mode, and arbitrary combinations) may be made without departing from the spirit of the present invention, and should also belong to the scope of the present invention.

Scanning time comparison of the abovementioned predetermined scanning modes shown in FIG. 3-FIG. 6 can be summarized in the following table, wherein "m" indicates a column channel number of the first electrodes, "n" indicates a row channel number of the second electrodes, "Q" indicates a number of touched points, and "Ts" indicates a period for scanning one touch.

| Scanning mode | Scanning time |
|---|---|
| Sequence scanning mode | $(1 + m \times n) \times Ts$ |
| Row scanning mode | $(1 + m + 2 \times Q \times n) \times Ts$ |
| Column scanning mode | $(1 + n + 2 \times Q \times m) \times Ts$ |
| Matrix scanning mode | $(1 + m + n + 4 \times Q^2) \times Ts$ |

As one can see, by adopting the predetermined scanning mode (such as, the sequence scanning mode shown in FIG. 3, the row scanning mode shown in FIG. 4, the column scanning mode shown in FIG. 5, or the matrix scanning mode shown in FIG. 6) disclosed in the present invention, the scanning circuit is capable of detecting multi touches on the resistive multi-touch device more quickly.

Figure 7:
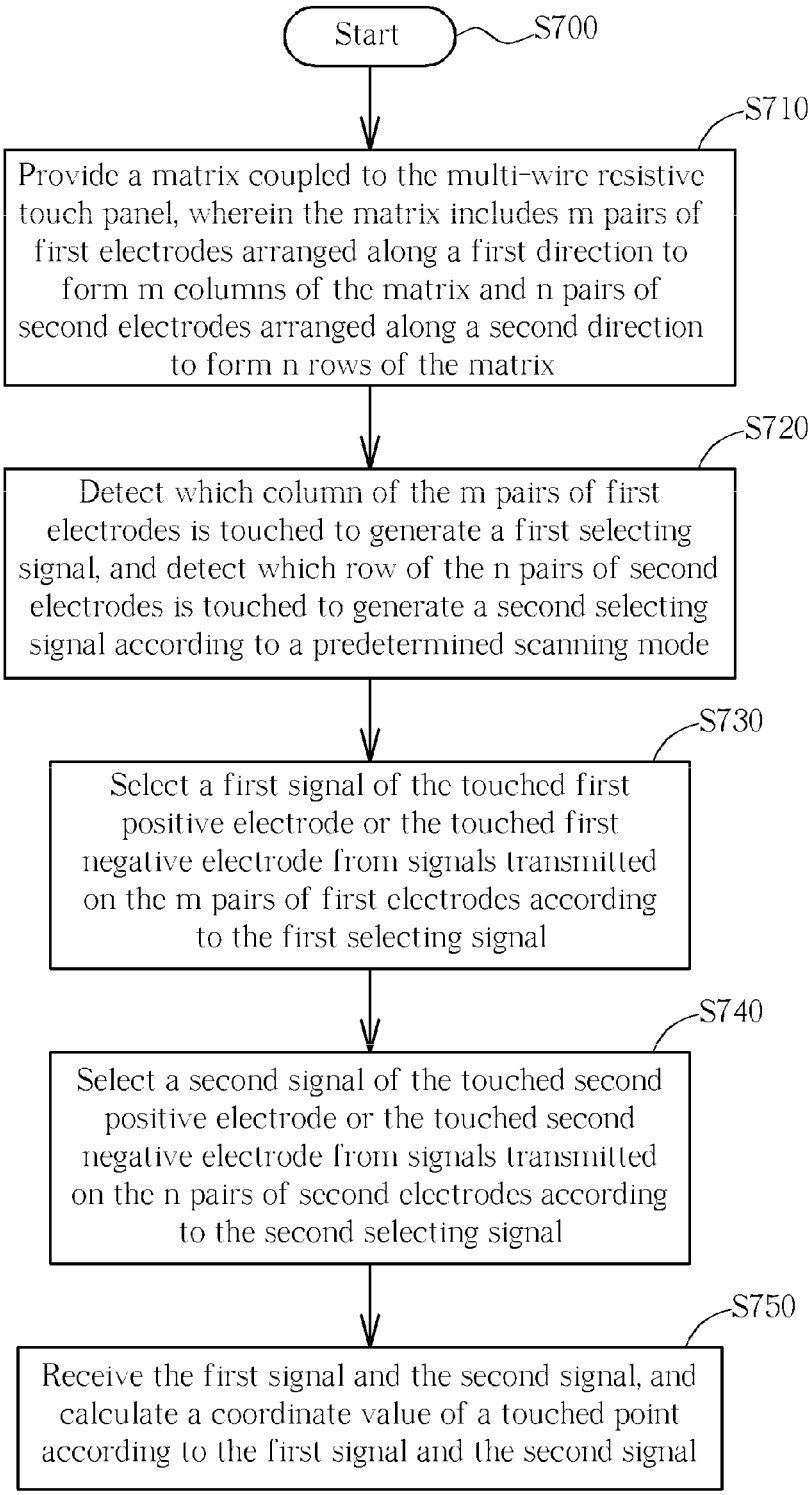
FIG. 7 a flowchart illustrating a method for method for detecting touched points of a resistive multi-touch device according to an exemplary embodiment of the present invention.

Please refer to FIG. 7. FIG. 7 a flowchart illustrating a method for method for detecting touched points of a resistive multi-touch device according to an exemplary embodiment of the present invention. Please note that the following steps are not limited to be performed according to the exact sequence shown in FIG. 4 if a roughly identical result can be obtained. The method includes, but is not limited to, the following steps:

Step S700: Start.

Step S710: Provide a matrix coupled to the multi-wire resistive touch panel, wherein the matrix includes m pairs of first electrodes arranged along a first direction to form m columns of the matrix and n pairs of second electrodes arranged along a second direction to form n rows of the matrix.

Step S720: Detect which column of the m pairs of first electrodes is touched to generate a first selecting signal, and detect which row of the n pairs of second electrodes is touched to generate a second selecting signal according to a predetermined scanning mode.

Step S730: Select a first signal of the touched first positive electrode or the touched first negative electrode from signals transmitted on the m pairs of first electrodes according to the first selecting signal.

Step S740: Select a second signal of the touched second positive electrode or the touched second negative electrode from signals transmitted on the n pairs of second electrodes according to the second selecting signal.

Step S750: Receive the first signal and the second signal, and calculate a coordinate value of a touched point according to the first signal and the second signal.

How each element operates can be known by collocating the steps shown in FIG. 7 and the elements shown in FIG. 1 and FIG. 2A (or FIG. 2B), and further description is omitted here for brevity. Be noted that the step S720 can be executed by the scanning circuit 130, the step S730 can be executed by the first multiplexer 140, the step S740 can be executed by the second multiplexer 150, and the step S750 can be executed by the touch controller 160.

Please note that, the steps of the abovementioned flowchart are merely a practicable embodiment of the present invention, and in no way should be considered to be limitations of the scope of the present invention. The method can include other intermediate steps or several steps can be merged into a single step without departing from the spirit of the present invention. For example, the step S720 may include several intermediate steps, as is detailed in FIG. 8~FIG. 11.

Figure 8:
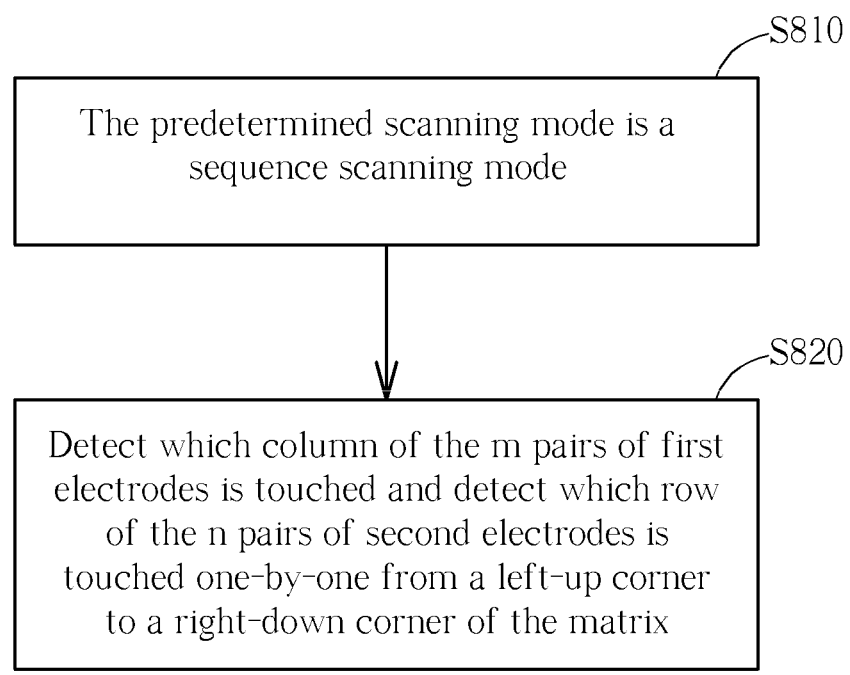
FIG. 8 a flowchart illustrating detailed steps of the step S720 shown in FIG. 7 according to an exemplary embodiment of the present invention.

Please refer to FIG. 8. FIG. 8 a flowchart illustrating detailed steps of the step S720 shown in FIG. 7 according to an exemplary embodiment of the present invention. The method includes, but is not limited to, the following steps:

Step S810: The predetermined scanning mode is a sequence scanning mode.

Step S820: Detect which column of the m pairs of first electrodes is touched and detect which row of the n pairs of second electrodes is touched one-by-one from a left-up corner to a right-down corner of the matrix.

How each step operates can be known by collocating the steps shown in FIG. 8 and the diagram shown in FIG. 3, and further description is omitted here for brevity.

Figure 9:
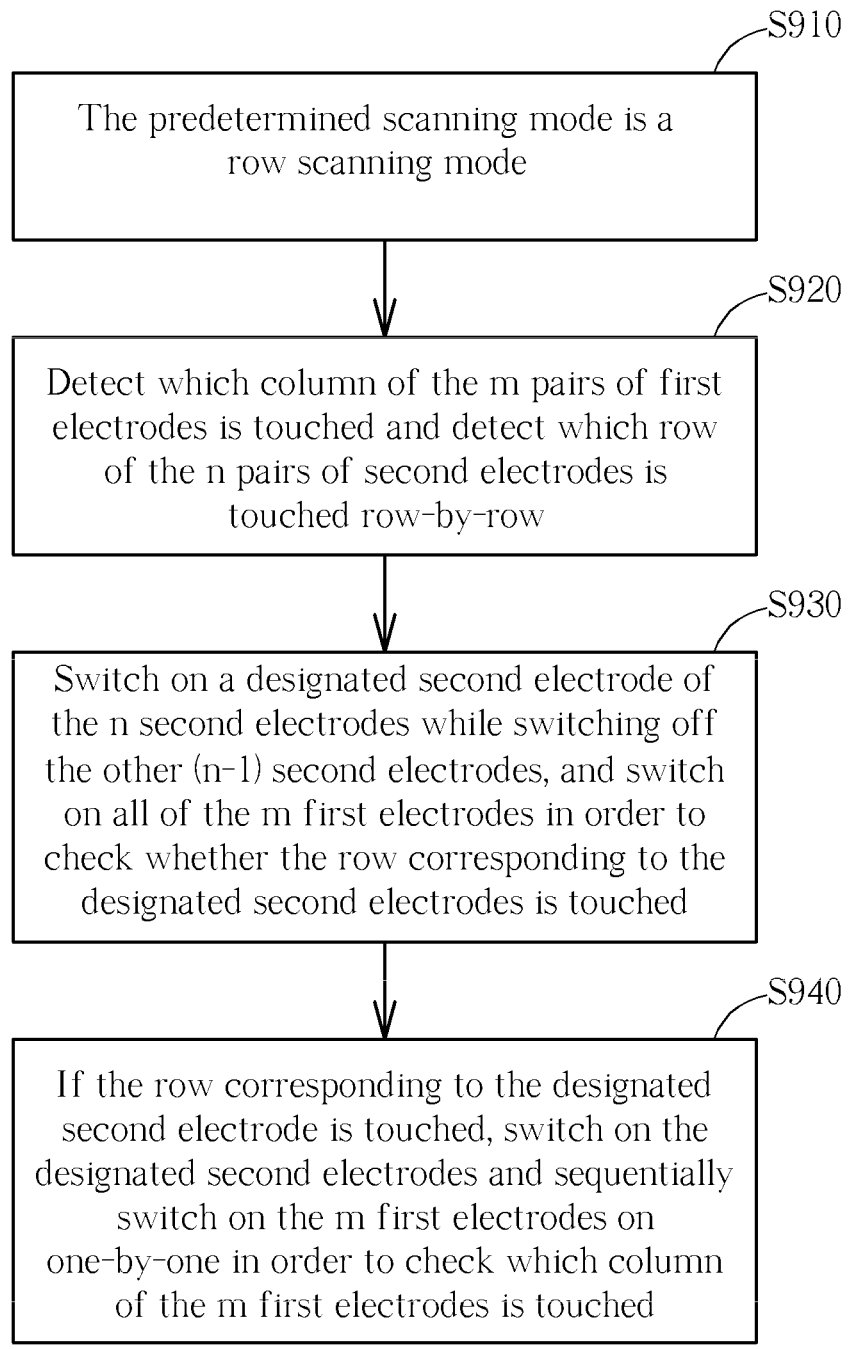
FIG. 9 a flowchart illustrating detailed steps of the step S720 shown in FIG. 7 according to another exemplary embodiment of the present invention.

Please refer to FIG. 9. FIG. 9 a flowchart illustrating detailed steps of the step S720 shown in FIG. 7 according to another exemplary embodiment of the present invention. The method includes, but is not limited to, the following steps:

Step S910: The predetermined scanning mode is a row scanning mode.

Step S920: Detect which column of the m pairs of first electrodes is touched and detect which row of the n pairs of second electrodes is touched row-by-row.

Step S930: Switch on a designated second electrode of the n second electrodes while switching off the other (n−1) second electrodes, and switch on all of the m first electrodes in order to check whether the row corresponding to the designated second electrodes is touched.

Step S940: If the row corresponding to the designated second electrode is touched, switch on the designated second electrodes and sequentially switch on the m first electrodes on one-by-one in order to check which column of the m first electrodes is touched.

How each step operates can be known by collocating the steps shown in FIG. 9 and the diagram shown in FIG. 4, and further description is omitted here for brevity.

Figure 10:
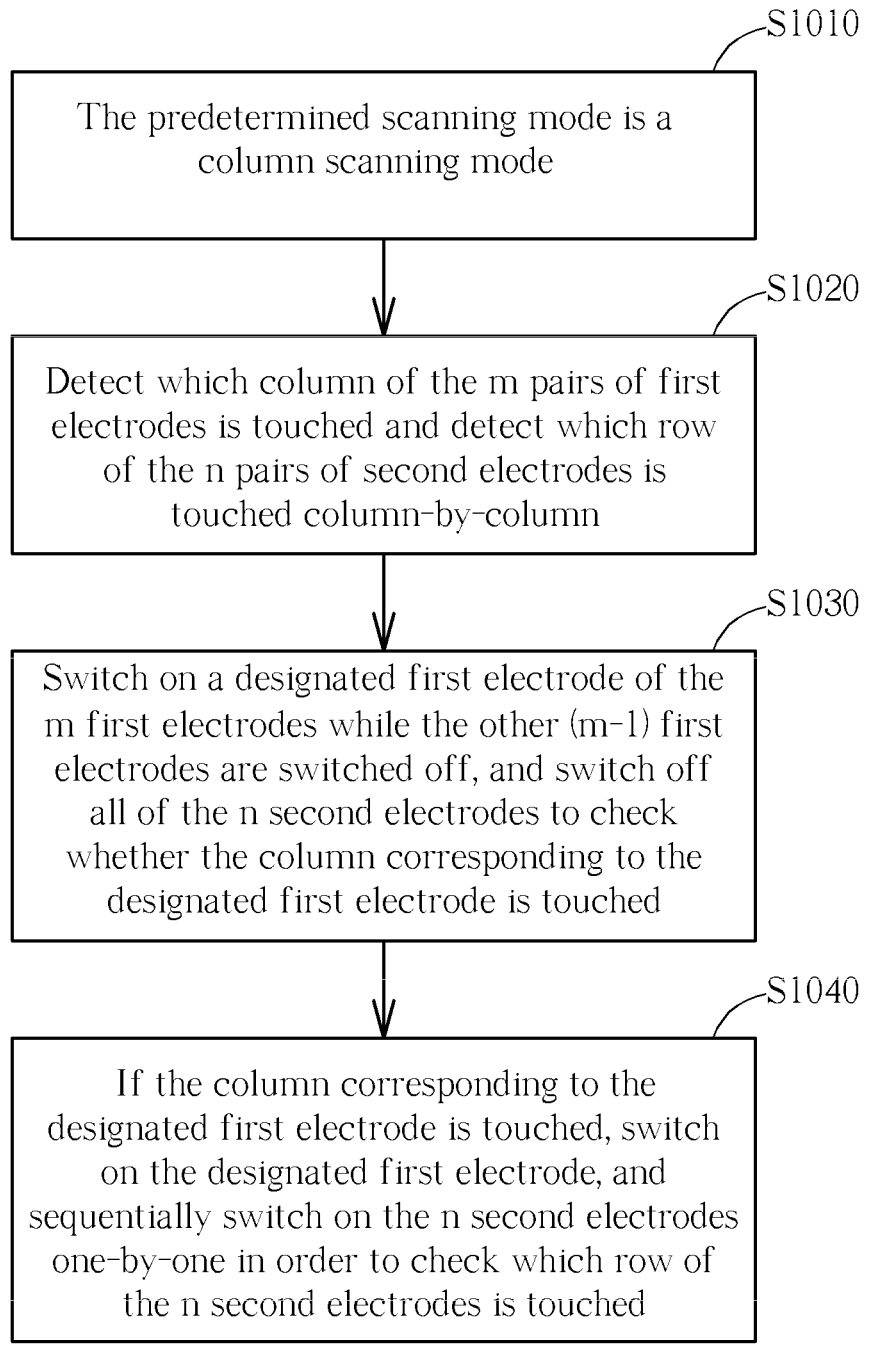
FIG. 10 a flowchart illustrating detailed steps of the step S720 shown in FIG. 7 according to still another exemplary embodiment of the present invention.

FIG. 10 a flowchart illustrating detailed steps of the step S720 shown in FIG. 7 according to still another exemplary embodiment of the present invention.

Step S1010: The predetermined scanning mode is a column scanning mode.

Step S1020: Detect which column of the m pairs of first electrodes is touched and detect which row of the n pairs of second electrodes is touched column-by-column.

Step S1030: Switch on a designated first electrode of the m first electrodes while the other (m−1) first electrodes are switched off, and switch off all of the n second electrodes to check whether the column corresponding to the designated first electrode is touched.

Step S1040: If the column corresponding to the designated first electrode is touched, switch on the designated first electrode, and sequentially switch on the n second electrodes one-by-one in order to check which row of the n second electrodes is touched.

How each step operates can be known by collocating the steps shown in FIG. 10 and the diagram shown in FIG. 5, and further description is omitted here for brevity.

Figure 11:
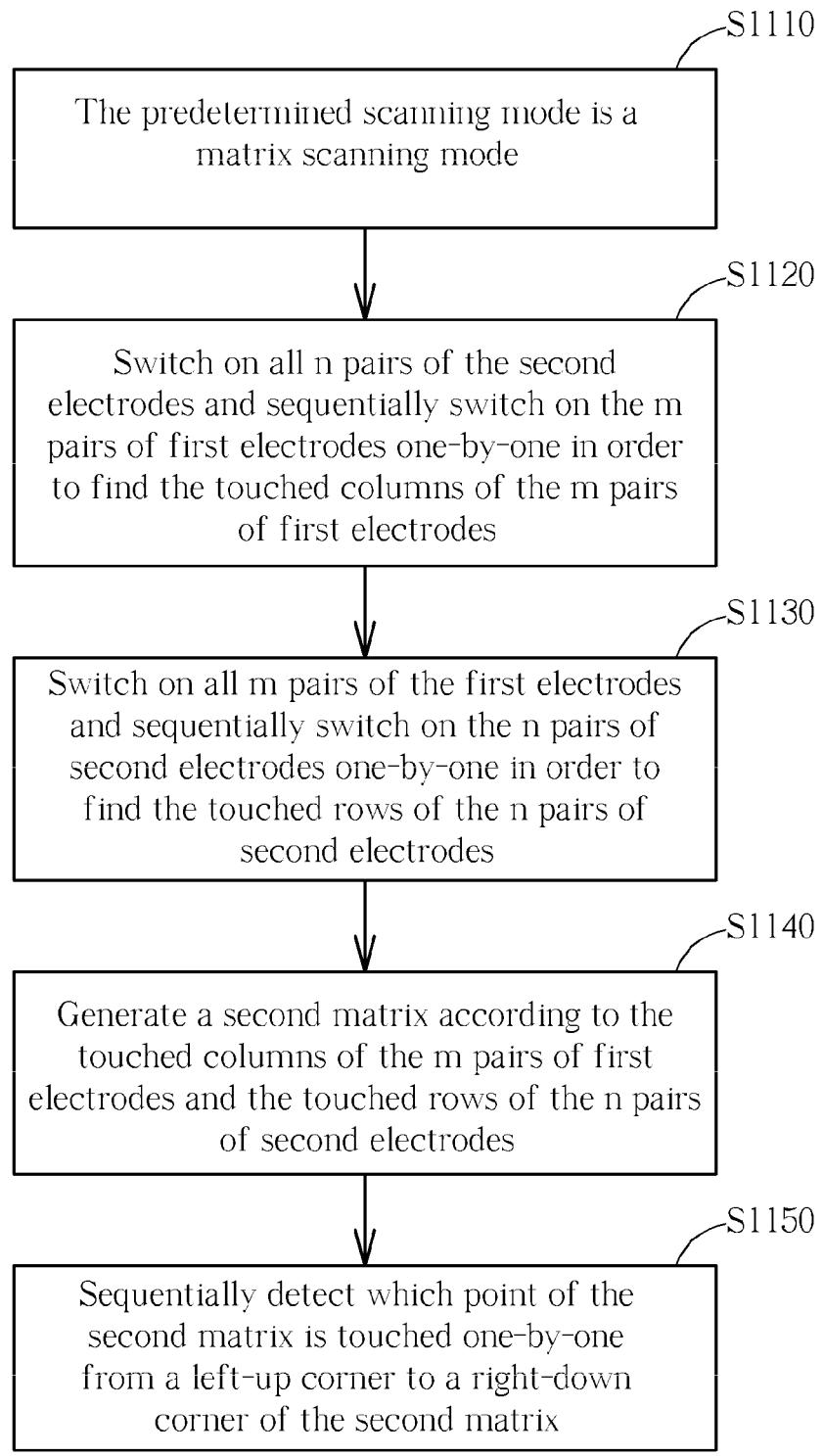
FIG. 11 a flowchart illustrating detailed steps of the step S720 shown in FIG. 7 according to still another exemplary embodiment of the present invention.

FIG. 11 a flowchart illustrating detailed steps of the step S720 shown in FIG. 7 according to still another exemplary embodiment of the present invention.

Step S1110: The predetermined scanning mode is a matrix scanning mode.

Step S1120: Switch on all n pairs of the second electrodes and sequentially switch on the m pairs of first electrodes one-by-one in order to find the touched columns of the m pairs of first electrodes.

Step S1130: Switch on all m pairs of the first electrodes and sequentially switch on the n pairs of second electrodes one-by-one in order to find the touched rows of the n pairs of second electrodes.

Step S1140: Generate a second matrix according to the touched columns of the m pairs of first electrodes and the touched rows of the n pairs of second electrodes.

Step S1150: Sequentially detect which point of the second matrix is touched one-by-one from a left-up corner to a right-down corner of the second matrix.

How each step operates can be known by collocating the steps shown in FIG. 11 and the diagram shown in FIG. 6, and further description is omitted here for brevity.

The abovementioned embodiments are presented merely for describing features of the present invention, and in no way should be considered to be limitations of the scope of the present invention. In summary, the present invention provides a resistive multi-touch device and a method for detecting touched points of a resistive multi-touch device. By adopting the predetermined scanning mode (such as, the sequence scanning mode shown in FIG. 3, the row scanning mode shown in FIG. 4, the column scanning mode shown in FIG. 5, and the matrix scanning mode shown in FIG. 6) disclosed in the present invention, the scanning time for detecting multi touches on the resistive multi-touch device can be improved.

Those skilled in the art will readily observe that numerous modifications and alterations of the device and method may be made while retaining the teachings of the invention.

What is claimed is:

1. A resistive multi-touch device, comprising:
   a multi-wire resistive touch panel;
   a matrix, coupled to the multi-wire resistive touch panel, the matrix comprising:
      m pairs of first electrodes, arranged along a first direction to form m columns of the matrix, wherein each pair of first electrodes comprises a first positive electrode and a first negative electrode; and
      n pairs of second electrodes, arranged along a second direction to form n rows of the matrix, wherein each pair of second electrodes comprises a second positive electrode and a second negative electrode;
   a scanning circuit, for detecting which column of the m pairs of first electrodes is touched to generate a first selecting signal and for detecting which row of the n pairs of second electrodes is touched to generate a second selecting signal according to a predetermined scanning mode;
   a first multiplexer, coupled to the m first positive electrodes or the m first negative electrodes and the scanning circuit, for selecting a first signal of the touched first positive electrode or the touched first negative electrode from signals transmitted on the m pairs of first electrodes according to the first selecting signal;
   a second multiplexer, coupled to the n second positive electrodes or the n second negative electrodes and the scanning circuit, for selecting a second signal of the touched second positive electrode or the touched second negative electrode from signals transmitted on the n pairs of second electrodes according to the second selecting signal; and
   a touch controller, coupled to the first multiplexer and the second multiplexer, for receiving the first signal and the second signal, and for calculating a coordinate value of a touched point according to the first signal and the second signal;
   wherein the predetermined scanning mode is a matrix scanning mode, and the scanning circuit detects which column of the m pairs of first electrodes is touched and detects which row of the n pairs of second electrodes is touched according to a second matrix;
   the second matrix is generated according to the touched columns of the m pairs of first electrodes and the touched rows of the n pairs of second electrodes; and
   the scanning circuit sequentially detects which point of the second matrix is touched one-by-one from a left-up corner to a right-down corner of the second matrix.

2. The resistive multi-touch device of claim 1, wherein the second matrix is generated according to the matrix.

3. The resistive multi-touch device of claim 1, wherein all of the n pairs of second electrodes are switched on and the m pairs of first electrodes are sequentially switched on one-by-one in order to find the touched columns of the m pairs of first electrodes; and all of the m pairs of first electrodes are switched on and the n pairs of second electrodes are sequentially switched on one-by-one in order to find the touched rows of the n pairs of second electrodes.

4. The resistive multi-touch device of claim 1, wherein the scanning circuit is further used for detecting which point of the second matrix is touched row-by-row.

5. The resistive multi-touch device of claim 1, wherein the scanning circuit is further used for detecting which point of the second matrix is touched column-by-column.

6. A method for detecting touched points of a resistive multi-touch device having a multi-wire resistive touch panel, comprising the following steps:
   providing a matrix coupled to the multi-wire resistive touch panel, wherein the matrix comprises m pairs of first electrodes arranged along a first direction to form m columns of the matrix and n pairs of second electrodes arranged along a second direction to form n rows of the matrix, each pair of first electrodes comprises a first positive electrode and a first negative electrode, and each pair of second electrodes comprises a second positive electrode and a second negative electrode;
   detecting which column of the m pairs of first electrodes is touched to generate a first selecting signal and detecting which row of the n pairs of second electrodes is touched to generate a second selecting signal according to a predetermined scanning mode;
   selecting a first signal of the touched first positive electrode or the touched first negative electrode from signals transmitted on the m pairs of first electrodes according to the first selecting signal;
   selecting a second signal of the touched second positive electrode or the touched second negative electrode from signals transmitted on the n pairs of second electrodes according to the second selecting signal; and
   receiving the first signal and the second signal, and calculating a coordinate value of a touched point according to the first signal and the second signal;
   wherein the predetermined scanning mode is a matrix scanning mode, and the step of detecting which column of the m pairs of first electrodes is touched and detecting which row of the n pairs of second electrodes is touched according to a predetermined scanning mode comprises detecting which column of the m pairs of first electrodes is touched and detecting which row of the n pairs of second electrodes is touched according to a second matrix; and
   the step of detecting which column of the m pairs of first electrodes is touched and detecting which row of the n pairs of second electrodes is touched according to the second matrix comprises:
      generating the second matrix according to the touched columns of the m pairs of first electrodes and the touched rows of the n pairs of second electrodes; and sequentially detecting which point of the second matrix is touched one-by-one from a left-up corner to a right-down corner of the second matrix.

7. The method of claim 6, wherein the second matrix is generated according to the matrix.

8. The method of claim 7, wherein the step of detecting which column of the m pairs of first electrodes is touched and detecting which row of the n pairs of second electrodes is touched according to the second matrix comprises:
   switching on all n pairs of the second electrodes and sequentially switching on the m pairs of first electrodes one-by-one in order to find the touched columns of the m pairs of first electrodes; and
   switching on all m pairs of the first electrodes and sequentially switching on the n pairs of second electrodes one-by-one in order to find the touched rows of the n pairs of second electrodes.

9. The method of claim 8, wherein the step of detecting which column of the m pairs of first electrodes is touched and detecting which row of the n pairs of second electrodes is touched according to the second matrix comprises:
   detecting which point of the second matrix is touched row-by-row.

10. The method of claim 9, wherein the step of detecting which column of the m pairs of first electrodes is touched and detecting which row of the n pairs of second electrodes is touched according to the second matrix comprises:
    detecting which point of the second matrix is touched column-by-column.

\* \* \* \* \*